May 1, 1923.                                                          1,453,391
R. E. HELLMUND
ALTERNATING CURRENT COMMUTATOR GENERATOR
Filed Aug. 10, 1918                5 Sheets-Sheet 1

WITNESSES:

INVENTOR
Rudolf E. Hellmund
BY
ATTORNEY

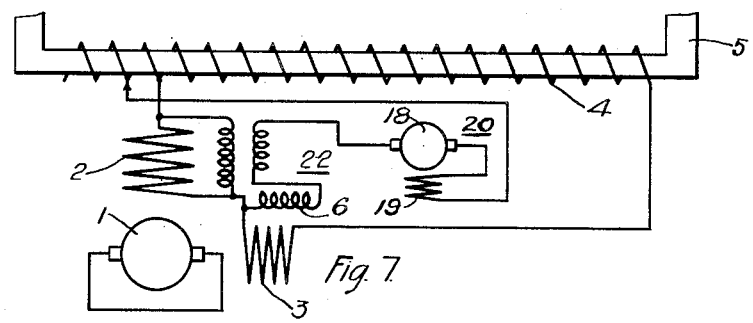
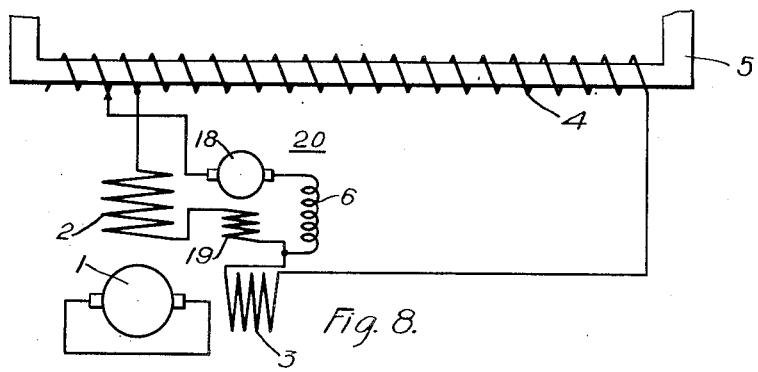
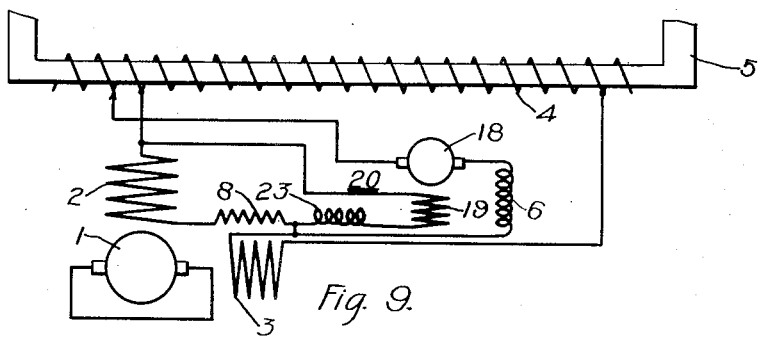

May 1, 1923.

R. E. HELLMUND 1,453,391

ALTERNATING CURRENT COMMUTATOR GENERATOR

Filed Aug. 10, 1918    5 Sheets-Sheet 4

WITNESSES:
H.B. Funk
a.a. Brand

INVENTOR
Rudolf E. Hellmund.
BY
Wesley G. Carr
ATTORNEY

May 1, 1923.

R. E. HELLMUND 1,453,391

ALTERNATING CURRENT COMMUTATOR GENERATOR

Filed Aug. 10, 1918        5 Sheets-Sheet 5

WITNESSES:

INVENTOR
Rudolf E. Hellmund
BY
ATTORNEY

Patented May 1, 1923.

1,453,391

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

ALTERNATING-CURRENT COMMUTATOR GENERATOR.

Application filed August 10, 1918. Serial No. 249,332.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Alternating-Current Commutator Generators, of which the following is a specification.

My invention relates to alternating-current commutator generators and it has special relation to means whereby alternating-current commutator motors when used for the generation of currents may be made more efficient and stable in operation.

It is well known that, when an alternating-current commutator motor is reversed and used as a generator, there may be undesirable low-frequency currents generated which, upon flowing through the apparatus and line, occasion excessive heating therein, though furnishing no useful energy. While I am aware that certain expedients, such, for instance, as the insertion of resistance in the rotor circuits (see U. S. Patent No. 1,194,671, issued to Karl Schnetzler Aug. 15, 1916) have been proposed to eliminate these undesirable currents, it is apparent that such expedients, in themselves, will occasion considerable ohmic losses and, therefore, although reducing the heating, will also result in inefficient generation. It will be understood that, where I hereinafter refer to low-frequency currents, direct currents or those having a zero frequency, are also included.

I therefore propose to employ means whereby such low-frequency currents as may be initially generated are shunted around the main field of the generator and any increased low frequency excitation is avoided. In addition, I intend to supply means whereby the impressed voltage which would necessarily have to be changed somewhat upon the insertion of such shunt, may be varied in accordance with the shunting arrangement used.

Figure 1:
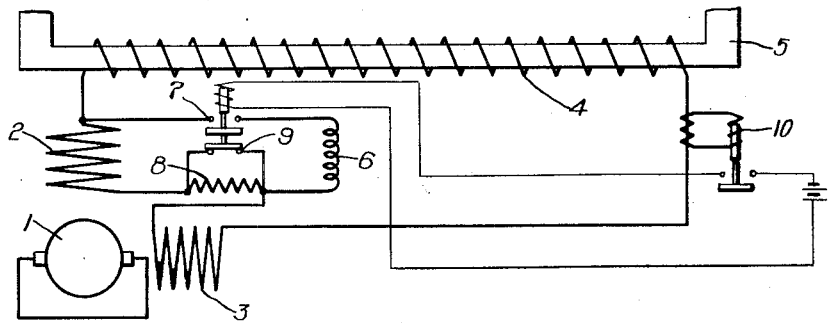

For a clearer understanding of my invention, reference may be had to the drawings in which Fig. 1 is a diagram illustrating one method by which undesirable low-frequency currents are eliminated, and Figs. 2 to 14, inclusive, are similar views illustrating modifications thereof.

Referring now more particularly to Fig. 1, a commutator generator 1, provided with an exciting field winding 2 and an inducing field winding 3, is shown. Recuperative energy is furnished from the machine 1 to an alternating-current line through any suitable means, such, for example, as the secondary winding 4 of a transformer 5. While I have shown the transformer as of the double-winding type, it is permissible, and may be preferable, to use an auto-transformer under some circumstances.

An inductive device 6 is connected in parallel relationship to the exciting field winding 2 of the main machine 1, and a switch 7 is provided for connecting and disconnecting said inductive device 6 from circuit with the field winding 2. A resistor 8 is placed in series circuit with the exciting field winding 2, and a switch 9 is provided for short-circuiting this resistor at predetermined times.

It is apparent that the arrangement of the various inductive and resistance devices should be such as to make the combined resistance of the exciting field winding 2 and the inserted resistor 8 much larger than the resistance of the inductive device 6; while, on the other hand, the inductive effect of the inductive device 6, at normal frequency, should be appreciably larger than the combined inductance of the exciting field winding 2 and the resistor 8.

With these assumptions, it is evident that the largest part of the line-frequency currents passes through the main field winding 2 and, furthermore, that the inductive device 6 shunts only a small part of said line frequency. Any low-frequency currents, however, which tend to flow will pass principally through the inductive device 6 and will, thereby, be precluded from affecting the operation of the main motor. For convenience of operation, I have shown a relay mechanism 10 which may operate at specified times, or when the total current exceeds predetermined values, to close the switch 7 and open the switch 9, thereby bringing into operation the resistance and inductive devices.

Whenever the inductive device 6 is connected in circuit, a certain part of the line-frequency field current is shunted and this, in turn, will materially decrease the regenerative current if no voltage alteration is made at the time the shunting devices are placed in circuit.

Figure 2:
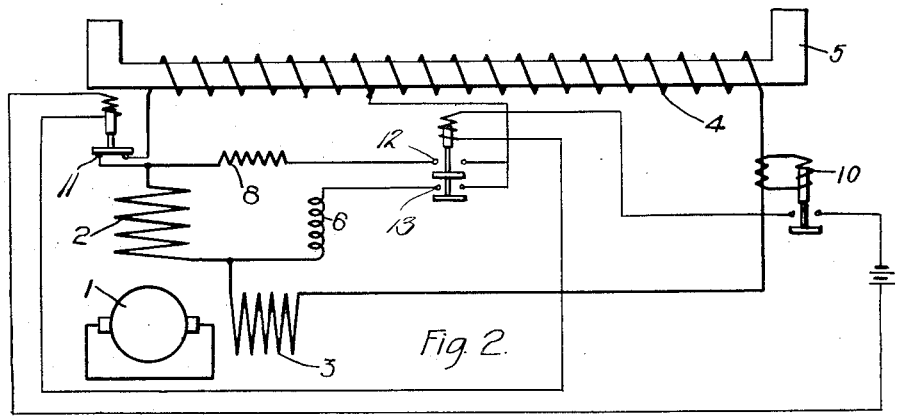
Figure 3:
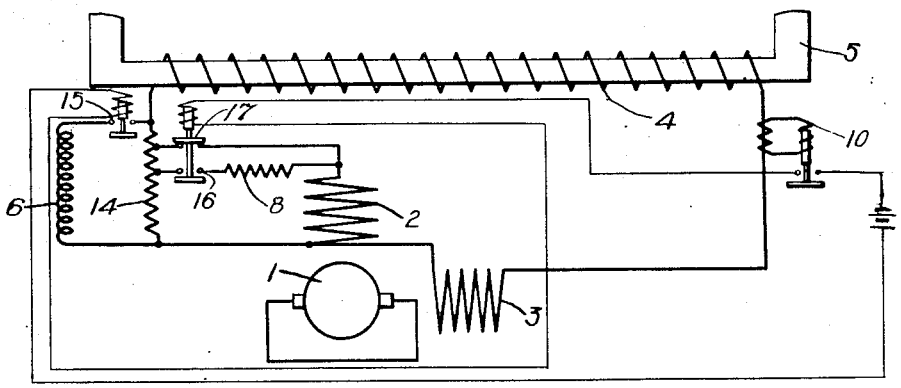

In Figs. 2 and 3, I have shown means whereby this alteration may be made when the inductive and resistance devices are made active. To this end, I have further provided switches 11, 12 and 13. It will be observed that if, when the switches 12 and 13 are closed to place the shunting devices in circuit, the switch 11 is opened, the necessary voltage alteration will be provided.

In Fig. 3 is shown a somewhat different arrangement for providing the necessary alteration; in this modification I employ means to vary the field current. I here make use of a series transformer 14 which is placed in parallel relationship with the inductive device 6 and connected thereto through a switch 15. Further switches 16 and 17 are provided and are connected in shunt and series relationship, respectively, with the inserted resistor 8. The switch 17 is normally closed but if low-frequency currents are produced by self-excitation, the relay 10 operates to close switch 15, thereby connecting the inductance 6 in parallel with the field winding. This, in turn, results in a weakening of the field, and, in order to compensate therefor, the secondary transformer turns are reduced by the opening of switch 17 and the closing of switch 16. With an auto transformer as shown, the secondary current is increased by the above operation, that is, in the system illustrated, the field current. The operation of the switches in the above sequence also introduces the resistance element 8 in the field circuit.

Figure 4:
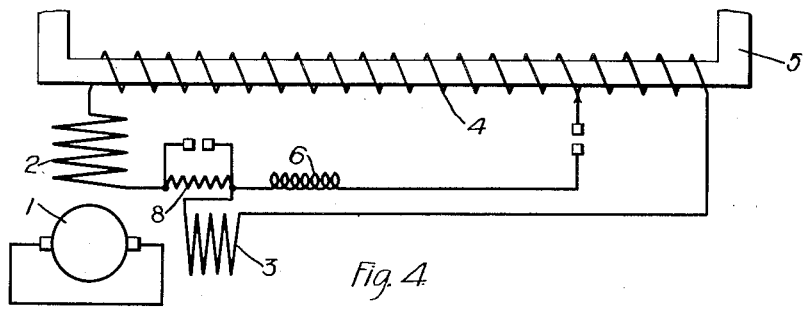

In Fig. 4 is shown an alternative arrangement of the shunting devices in which the inductive device is shown as connected to a point on the transformer. With the arrangement as shown in Fig. 1, the insertion of a resistance element in the field circuit will, in some instances, cause a difference of phase between the field current and that flowing through the inductive device. This results in a phase difference between the field current and the armature current, a feature which is, at times, undesirable. However, by connecting the resistance 6 as shown in Fig. 4, the above undesirable feature can be eliminated, as it is possible, by proper proportioning, to establish any phase divergence which is desirable between the various currents. By shifting the inductance lead from the position shown in Fig. 1 towards the right, as shown in Fig. 4, the two parallel currents may be made to approach each other, in phase, until they are substantially coincident. Further shifting of the aforesaid lead in the same direction will cause a phase difference in the opposite direction to that existing in Fig. 1.

In Figs. 5 to 9, inclusive, I have shown further means for accomplishing the desired result by the use of additional dynamo-electric machines of the commutator type. In all of the figures referred to, the commutator machines are used, more or less, as negative-resistance units. It will be understood that, by placing a commutator-type machine in circuit and regulating the voltage in the desired direction, an effect may be obtained which is known as a negative resistance.

Figure 5:
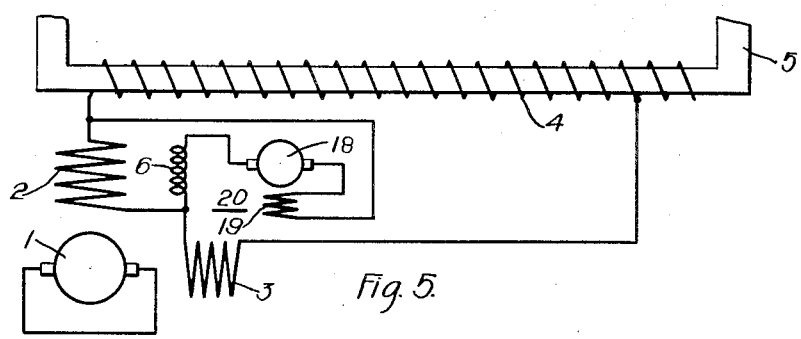

In Fig. 5, the hereinbefore described repulsion-motor-generator 1, provided with the exciting field winding 2 and the inducing field winding 3, is shown as having its exciting field winding 2 shunted through a circuit containing the aforementioned inductive device 6, and an armature 18 and field winding 19 of an auxiliary dynamo-electric machine of the commutator type 20. Assume now that a low-frequency current exists, it is apparent that a large part of the same will pass through the inductive device 6 and the auxiliary machine 20. This auxiliary machine 20 is so arranged that it acts as a series-excited booster machine or what may be more exactly defined as a negative resistance and immediately draws the low-frequency currents through the shunt, thereby reducing to a minimum the amount of such low-frequency currents which tend to pass through the main field winding 2.

Figure 6:
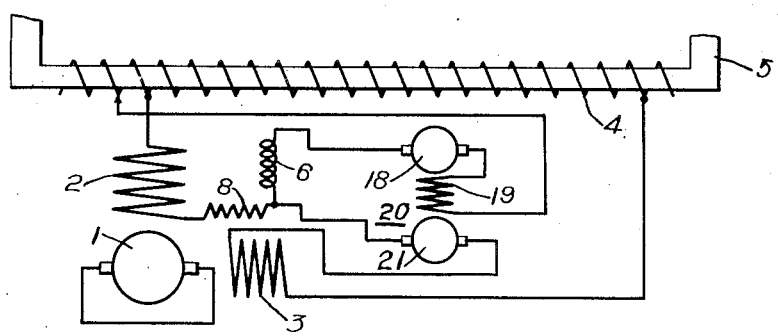

There may be some danger of the low-frequency currents which are generated by the auxiliary machines passing out and through the main circuit but this, in turn, is guarded against by the provision of the second auxiliary machine 21, as shown in Fig. 6. The more convenient and practical method of obtaining the result shown in Fig. 6 is by mounting two armatures on the same machine but arranging their voltages to act in opposite and equal sense. By the use of such an arrangement, the armature 18 may drive whatever low-frequency currents exist initially through the shunt but, due to the counteracting influence of its associated armature 20, it cannot cause any low-frequency currents to flow through the main circuit.

In order to counteract the disturbing influence which a portion of the line frequency current going through the shunt may have upon the current in the exciting field winding 2, a further slight voltage correction is desirable. I have shown in Fig. 7, a small transformer 22 which furnishes the desired correction.

It is evident that, inasmuch as the field voltage and current are of line frequency, the transformer winding in parallel to the field winding 2 sets up a transformer flux of line frequency and this, in turn, induces a line-frequency voltage in the secondary winding which may be arranged to oppose the line-frequency currents in the shunt circuit and thus reduce them. Similarly, the low-frequency currents in the shunting circuit act through the transformer to oppose currents of like characteristics in the field circuit.

In Fig. 8, I have again provided but one auxiliary machine to accomplish the filtering action, but have so arranged it in this figure that, after the initial elimination of the low-frequency currents from the main motor circuit, there is no longer any tendency for a self-excited low-frequency current to be built up by the auxiliary machines. In this figure, the main exciting field winding 2 is shown as connected in series relationship with the field winding 19 of the auxiliary machine 20, while the armature 18 of said auxiliary machine is connected in series relationship with the inductive device 6 and the latter two elements are together placed in parallel with the aforementioned field windings 2 and 19. As soon as a low-frequency current exists in the field winding 19, the armature 18 will operate to draw the current of said frequency through the inductive device 6. This will, in turn, reduce to practically zero the amount of such low-frequency current which may have initially existed in the field winding 19, and will, therefore preclude the possibility of the auxiliary machine 18 becoming self-exciting and continuing to send the undesirable low frequency currents through the main circuit.

While the machine 18 may also tend to draw line frequency current through the shunt, this will be prevented by the high self-induction of the device 6.

Fig. 9 shows what may be, in some cases, a somewhat more effective arrangement of the resistance, inductive and auxiliary machine devices. It will be noted that there are three parallel circuits, one comprising a resistance element 8 and a field winding 2, another comprising an inductance 23 and the field winding 19 of the auxiliary machine, and still another comprising the element 6 and the armature winding 18 of the auxiliary machine. Any low-frequency currents which initially exist will tend to avoid the circuit with the resistance and pass through the two circuits comprising the inductive devices, and the low-frequency currents which are, in this way, passed through the field winding 19 induce a low-frequency voltage in the armature winding which, in turn, assists the flow of low-frequency current through the armature winding and, therefore, is instrumental in further shunting them away from the main field circuit.

Turning now to Figs. 10 to 14, inclusive, methods of using induction motors in conjunction with commutator-type machines are shown.

If an induction motor is run at a speed corresponding to the frequency of the line, the primary thereof will take only the necessary magnetizing current and will, therefore, constitute a path of highest impedance for currents of that frequency. I have made use of this principle in a system constructed in accordance with my invention and have found that induction machines may be so associated with the commutator-type machines that all of the undesirable low-frequency currents shall be substantially eliminated from the fields in which they tend to exert a harmful influence. This follows from the fact that the primary of the induction motor is practically a short circuit for any frequency but that corresponding to its speed.

Figure 10:
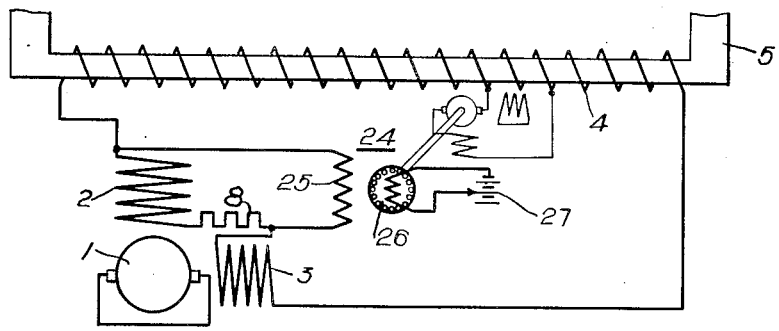

In Fig. 10, an induction motor 24 is shown with its primary 25 connected in parallel relationship with the exciting-field winding of the hereinbefore-described commutator-type machine 1. A direct-current winding 26, energized from any suitable source, such, for instance, as a battery 27, is shown and is wound in the well known manner to adjust the operation of the induction machine 24 and the amount of current of the line frequency taken thereby. It will be understood that the machine 24 is driven or started by any desirable auxiliary machine (as shown).

If, now, the induction machine is run at synchronism corresponding to the line frequency, the primary will, as has been explained, constitute a path of highest impedance for currents of line frequency but, for currents of the undesirable low frequencies, it will be a path of very small resistance only. The line currents will therefore substantially all pass through the field winding 2, while the low-frequency currents will be filtered out and returned to the line without passing through the exciting field.

Figure 11:
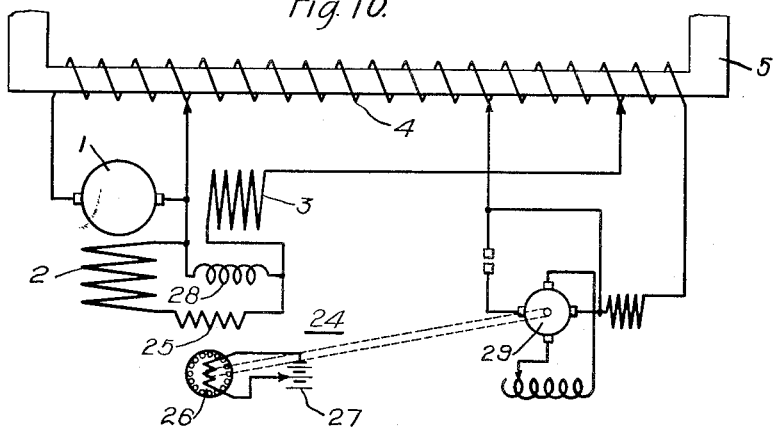

In Fig. 11, the induction machine 24 is shown with its primary 25 connected in series with the exciting-field winding, while an inductive device 28 is provided and connected in parallel relationship with both the exciting-field winding and the primary of the auxiliary induction machine. An auxiliary driving machine 29, shown here as of the commutator type, is provided to operate the induction machine 24 at a speed corresponding to synchronism with the frequency of the undesirable currents which it is desired to eliminate from the exciting-field winding. Any desired means may be employed for regulating the speed of the auxiliary driving machine. When the induction machine is operated at a speed corresponding to the frequency of the undesirable currents, a path of highest impedance will be provided for currents of that frequency and they will, therefore, seek an alternative path which will be provided through the low-resistance inductive device 28. It is to be understood, in this connection, that the frequency of the undesirable currents is determined by the various machine constants and can easily be calculated or ascertained by suitable test, and, thereafter, the speed of the driving motor 29 is fixed.

Figure 12:
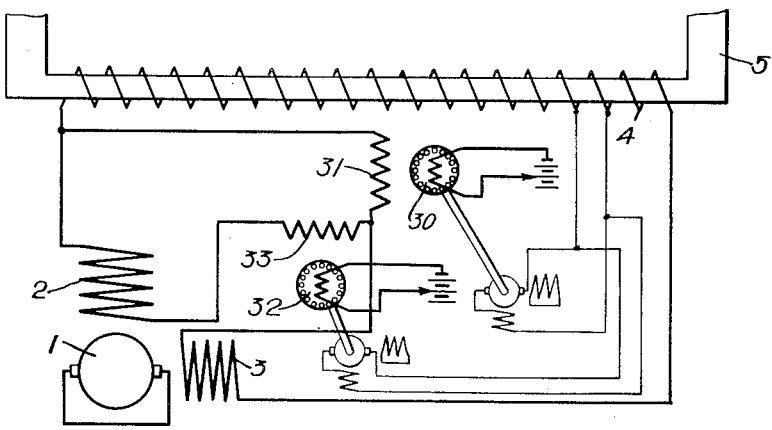

Fig. 12 represents a combination of the two systems described in Figs. 10 and 11. Here, a machine 30 has its primary 31 connected in parallel relationship with the exciting-field winding 2 while an additional machine 32 has its primary 33 connected in series with said exciting field. Both machines are provided with a direct-current winding for operation at synchronous speed. If the line frequency is a multiple of the undesirable low-frequency, the auxiliary induction machines may be wound with such number of poles that they both have the same synchronous speed; otherwise, it is necessary to employ an auxiliary driving machine with that induction motor the primary of which is connected in series with the exciting-field winding and thereby constitutes a path of high impedance for the low-frequency currents.

Figure 13:
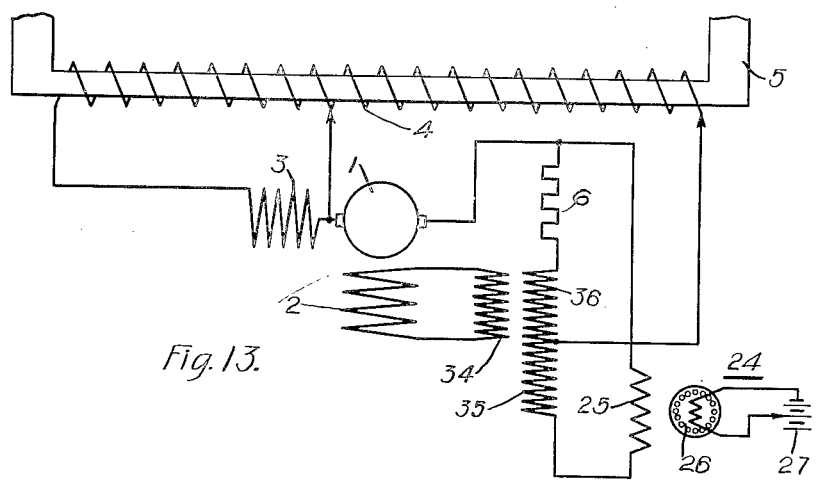

Fig. 13 shows the exciting field winding 2 energized from a secondary winding 34 of a transformer 35, the primary 36 of which is connected in series with the armature and a resistance 6. The primary 25 of the induction machine, in this case, is connected, as shown, across the extended primary winding 35—36 of the transformer and the resistance 6. The line current will flow from the source 4, through the mid-point of the winding 36 and then tend to divide, one portion flowing through the upper part of the winding and the resistance element, the other portion seeking to flow through the lower part of the winding 36 and the winding 25. However, the latter path offers very high impedance to currents of line frequency, for reasons above described, and substantially all of the line frequency current will, therefore, flow through the upper part of transformer winding 36. On the other hand, currents having frequencies differing from line frequency will flow equally well through both the upper and lower parts of winding 36, and the fluxes set up thereby will have a neutralizing effect upon each other.

If, therefore, the induction motor 24 be run at line frequency, its primary will provide a path of high impedance for the line-frequency currents but will allow the low-frequency currents, which it is desired to filter out, to pass freely. Moreover, even should undesirable low-frequency currents pass into the primary winding of the transformer 35, the undesirable fields set up thereby will tend to neutralize each other on account of the mid-point connection of the lead from the source of supply.

Figure 14:
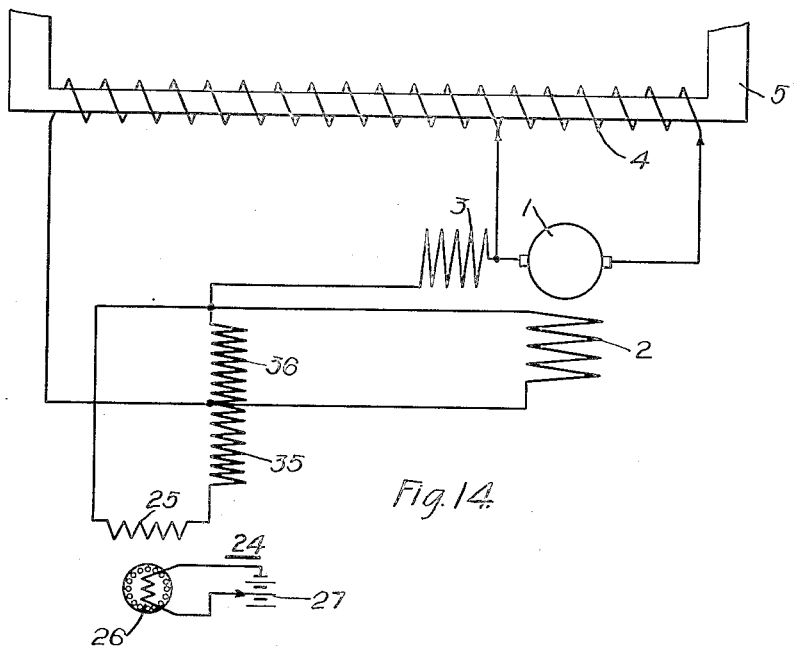

In Fig. 14 is shown a system similar to that described in connection with Fig. 13 with the exception that the transformer there employed is of the auto-transformer variety.

The direct-current excitation of the machine 24 may be omitted in all cases, if desired.

While I have shown several modifications of my invention, I wish it to be understood that I do not desire to have the appended claims limited by the specific forms of my invention herein employed as illustrations. It is entirely possible that there may be other feasible arrangements of small auxiliary machines whereby the same result may be accomplished and I therefore desire to broadly claim the means for filtering the aforementioned low-frequency currents by means of auxiliary devices, as hereinbefore described.

I claim as my invention:

1. The combination with a dynamo-electric machine of the commutator type having exciting and inducing field windings adapted to carry currents of a given frequency, of means associated with said exciting field winding constituting substantially a negative resistance for relatively low-frequency currents only.

2. The combination with a dynamo-electric machine of the commutator type, having exciting and inducing field windings, of an inductive device, and an auxiliary dynamo-electric machine of the commutator type, said inductive device and said auxiliary dynamo-electric machine being connected in series with each other and in shunt to said exciting field winding.

3. The combination with a dynamo-electric machine of the commutator type having exciting and inducing field windings, of an inductive device, and an auxiliary dynamo-electric machine of the commutator type, said inductive device and said auxiliary dynamo-electric machine being connected in series with each other and in shunt to said exciting field winding and together constituting a path of substantially zero impedance for such low-frequency currents as tend to flow through said exciting field winding.

4. The combination with a dynamo-electric machine of the commutator type having exciting and inducing field windings, of an inductive device, and an auxiliary dynamo-electric machine of the commutator type, said inductive device and said auxiliary dynamo-electric machine being connected in series with each other and in shunt to said exciting field winding, and said auxiliary dynamo-electric machine generating a voltage in such direction and of such frequency as to constitute a negative resistance for low-frequency currents which tend to flow through said exciting field winding.

5. The combination with a dynamo-electric machine of the commutator type having exciting and inducing field windings, of an inductive device, an auxiliary dynamo-electric machine of the commutator type, said inductive device and said auxiliary dynamo-electric machine being connected in series with each other and in shunt to said exciting field winding, and a second dynamo-electric machine of the commutator type connected in series circuit with said exciting field winding, said second dynamo-electric machine substantially neutralizing any low-frequency currents which said first-named dynamo-electric machine may cause to flow in a reverse direction therethrough.

In testimony whereof, I have hereunto subscribed my name this 31st day of July, 1918.

RUDOLF E. HELLMUND.